United States Patent
Qian et al.

(10) Patent No.: US 10,043,104 B2
(45) Date of Patent: Aug. 7, 2018

(54) AUTOMATIC MOVING OBJECT VERIFICATION

(71) Applicant: AVIGILON FORTRESS CORPORATION, Vancouver (CA)

(72) Inventors: Gang Qian, McLean, VA (US); Zeeshan Rasheed, Herndon, VA (US)

(73) Assignee: AVIGILON FORTRESS CORPORATION, Vancouver (CA)

( * ) Notice: Subject to any disclaimer, the term of this patent is extended or adjusted under 35 U.S.C. 154(b) by 141 days.

(21) Appl. No.: 14/962,269

(22) Filed: Dec. 8, 2015

(65) Prior Publication Data
US 2017/0068859 A1 Mar. 9, 2017

Related U.S. Application Data

(60) Provisional application No. 62/099,836, filed on Jan. 5, 2015.

(51) Int. Cl.
*G06K 9/46* (2006.01)
*G06K 9/62* (2006.01)
*G06K 9/00* (2006.01)

(52) U.S. Cl.
CPC ....... *G06K 9/6215* (2013.01); *G06K 9/00637* (2013.01)

(58) Field of Classification Search
CPC .......................... G06K 9/00637; G06K 9/6215
USPC ......................................................... 348/143
See application file for complete search history.

(56) References Cited

U.S. PATENT DOCUMENTS

| | | | |
|---|---|---|---|
| 2010/0013927 A1* | 1/2010 | Nixon | G01C 11/06 348/144 |
| 2011/0026849 A1* | 2/2011 | Kameyama | G06T 3/4053 382/260 |
| 2012/0221255 A1* | 8/2012 | Hubbell | G06F 19/18 702/20 |
| 2012/0243777 A1* | 9/2012 | Christopher | G06K 9/6278 382/154 |
| 2013/0235199 A1* | 9/2013 | Nixon | G01C 11/06 348/144 |
| 2016/0042232 A1* | 2/2016 | Scharf | G06Q 10/06315 382/110 |

* cited by examiner

*Primary Examiner* — Shan E Elahi
(74) *Attorney, Agent, or Firm* — MH2 Technology Law Group, LLP

(57) ABSTRACT

A method for determining a likelihood that a first object captured in a first image and a second object captured in a second image are the same object includes capturing the first image from a first viewpoint and a second image from a second viewpoint, wherein the first object is in the first image, and the second object is in the second image. The method also includes determining a first likelihood that a first visual feature on the first object and a second visual feature on the second object are the same visual feature, and determining a second likelihood that a dimension of the first object and a corresponding dimension of the second object are the same. The method then includes determining a final likelihood that the first object and the second object are the same object based at least partially upon the first likelihood and the second likelihood.

23 Claims, 8 Drawing Sheets

Jamaran (Iran), Length/Beam:308'/38'
Lat/Lon:27.1436°/56.2093°, Date:1/2/2014

Admiral Kuznetsov (Russia), Length/Beam:1000°/236'
Lat/Lon:69.0403°/33.0689°, Date:05/28/2014

| Ranked Top Matching BOLO Vessels | |
|---|---|
| Matching Scores | 110 |
| Vessel Dimension | 95% |
| Visual Features | 90% |
| Geometric Verification | 95% |
| Final Verification Probability | 93% |
| Matching Scores | 210 |
| Vessel Dimension | 80% |
| Visual Features | 84% |
| Geometric Verification | 80% |
| Final Verification Probability | 83% |

AUTOMATIC MOVING OBJECT VERIFICATION

CROSS-REFERENCE TO RELATED APPLICATIONS

This application claims priority to and the benefit of the U.S. Provisional patent application having Ser. No. 62/099,836, filed on Jan. 5, 2015, entitled "Automatic Ship Verification," to Zeeshan Rasheed et al., the entirety of which is incorporated by reference herein.

FIELD OF DISCLOSURE

This disclosure relates generally to the field of automated monitoring of visual surveillance images and, more particularly, to a system and method for monitoring and verifying the identity of an object using visual surveillance images captured from different viewpoints.

BACKGROUND

Visual surveillance data may include images obtained from a plurality of different viewpoints. For example, the navy may use surveillance images from an overhead view obtained by a satellite and from a side or oblique view obtained by an Unmanned Aircraft System ("UAS"). The images captured by the satellite may include ships having known identities. One or more of these ships may be classified as be-on-the-lookout ("BOLO") ships and stored in a BOLO database when their locations and activities are of particular interest.

A ship verification task for maritime Intelligence, Surveillance, and Reconnaissance ("ISR") requires a ship found in an image captured by a UAS to be compared against the ships in the BOLO database to determine whether the ship in the UAS image is, in fact, one of the ships in the BOLO database. As the images captured by the UAS are from a different viewpoint than the images captured by the satellite, this often makes a manual determination difficult and subject to human error. Therefore, what is desirable is an improved system and method for rapidly and accurately determining the likelihood that a ship in an image captured from a first viewpoint is the same ship that is in a different image captured from a second viewpoint.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method for determining a likelihood that a first object captured in a first image and a second object captured in a second image are the same object is disclosed. The method includes capturing the first image from a first viewpoint and a second image from a second viewpoint, wherein the first object is in the first image, and the second object is in the second image. The method also includes determining a first likelihood that a first visual feature on the first object and a second visual feature on the second object are the same visual feature, and determining a second likelihood that a dimension of the first object and a corresponding dimension of the second object are the same. The method then includes determining a final likelihood that the first object and the second object are the same object based at least partially upon the first likelihood and the second likelihood.

A non-transitory computer-readable medium is also disclosed. The medium stores instructions that, when executed by one or more processors of a computer system, cause the computer system to perform operations. The operations include providing an application to a user for installation on a second computer system. The first image is captured from a first viewpoint, and the first object is in the first image. The second image is captured from a second viewpoint, and the second object is in the second image. The operations also include determining a first likelihood that a first visual feature on the first object and a second visual feature on the second object are the same visual feature. The operations also include determining a second likelihood that a dimension of the first object and a corresponding dimension of the second object are the same. The operations also include determining a third likelihood that the first object is in the same geographic location as the second object at a time that the second image is captured. The operations then include determining a final likelihood that the first object and the second object are the same object based at least partially upon the first likelihood, the second likelihood, and the third likelihood. An alert, indicating the final likelihood, is transmitted over a wireless communication channel to a wireless device when the second computer system is offline. The alert causes the second computer system to auto-launch the application when the wireless device is connected to the second computer system.

A system for determining a likelihood that a first object captured in a first image and a second object captured in a second image are the same object is disclosed. The system includes a cross-view transform and matching engine configured to generate a matching score corresponding to a likelihood that a first visual feature on the first object in the first image and a second visual feature on the second object in the second image are the same visual feature. The system also includes a geometric verification engine configured to generate a matching score corresponding to a likelihood that a location of the first visual feature on the first object and a location of the second visual feature on the second object are the same location. The system also includes an object model generation engine configured to generate a matching score corresponding to a likelihood that a length of a portion of the first object and a length of a corresponding portion of the second object are the same length. The system also includes a geographic verification engine configured to generate a matching score corresponding to a likelihood that the first object is in the same geographic location as the second object at a time that the second image is captured. The system also includes a decision engine configured to determine a probability that the first and second objects are the same object based upon the matching scores from the cross-view transform and matching engine, the geometric verification engine, the object model generation unit, and the geographic verification engine.

BRIEF DESCRIPTION OF THE DRAWINGS

These and/or other aspects and advantages in the embodiments of the disclosure will become apparent and more readily appreciated from the following description of the various embodiments, taken in conjunction with the accompanying drawings of which.

DETAILED DESCRIPTION

Reference will now be made in detail to the various embodiments in the present disclosure. The embodiments are described below to provide a more complete understanding of the components, processes, and apparatuses disclosed herein. Any examples given are intended to be illustrative, and not restrictive. Throughout the specification and claims, the following terms take the meanings explicitly associated herein, unless the context clearly dictates otherwise. The phrases "in some embodiments" and "in an embodiment" as used herein do not necessarily refer to the same embodiment(s), though they may. Furthermore, the phrases "in another embodiment" and "in some other embodiments" as used herein do not necessarily refer to a different embodiment, although they may. As described below, various embodiments may be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes embodiments containing A, B, or C, multiple examples of A, B, or C, or combinations of A/B, A/C, B/C, A/B/B/ B/B/C, A/B/C, etc. In addition, throughout the specification, the meaning of "a," "an," and "the" include plural references. The meaning of "in" includes "in" and "on."

Figure 1A:
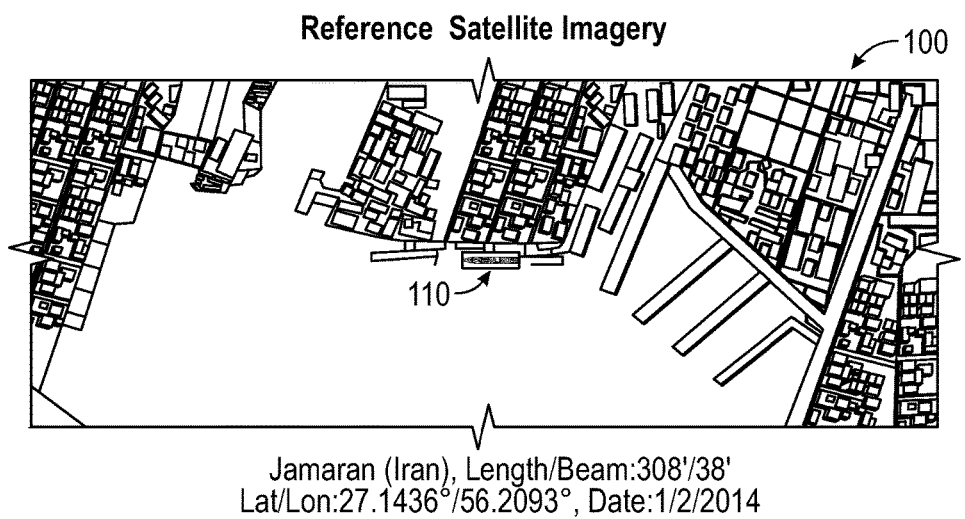
FIG. 1A illustrates a first image captured from a first viewpoint.
Figure 1B:
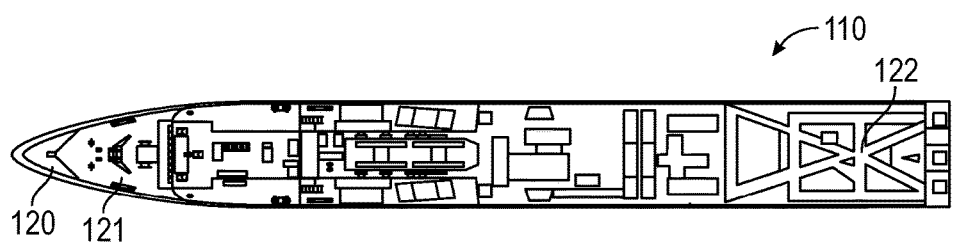
FIG. 1B illustrates an enlarged view of an object (e.g., a first ship) in the first image.

FIG. 1A illustrates a first image 100 captured from a first viewpoint, and FIG. 1B illustrates an enlarged view of an object 110 in the first image 100. The first image 100 may be captured by a first source, which may be any source configured to capture an image (i.e., take a picture or a video). In the exemplary embodiment described herein, the first source may be a satellite. Accordingly, as shown, the first image 100 is a top or overhead view.

The first image 100 may include an object 110. As shown, the object 110 may be a ship. However, as will be appreciated, a ship is merely one of many possible objects that may be found in the first image 100. Other illustrative objects may include a vehicle, an aircraft, a person, and the like. The identity of the object 110 may be known at the time the first image 100 is captured. For example, using data contained in the first image 100, it may be determined that the object 110 is the Iranian ship "Jamaran." In another embodiment, the identity of the object 110 may be determined using data unrelated to the image 100, such as a human intelligence report that the Jamaran was in the harbor at the time that the first image 100 was taken, or the like.

The first image 100 may be transmitted to an object verification module 600 (see FIG. 6), which may analyze the image 100 and/or metadata describing or associated with the image 100 to determine the geographic location of the object 110 (e.g., 27.1436° latitude/56.2093° longitude) and the size of the object 110 (e.g., length: 308'; beam: 38'). The image 100 and/or its metadata may also be analyzed to identify and enhance one or more distinctive visual features 120-122 that may be used to identify the object 110. Visual features may be selected based upon the distinctness or recognizability of their shape, appearance, geometry, configuration, color, attributes, and the like, which distinguish one object from another object (e.g., distinguish one ship from another ship). For example, illustrative visual features on a ship may be or include a helicopter landing pad, a jet runway, a radar detector, a weapon, posts, masts, markings, and the like. As shown in FIG. 1B, the object 110 includes three visual features 120-122. Once the visual features 120-122 are identified, a description of the features 120-122 may be prepared, and the features 120-122 and their descriptions may be indexed and stored so that the features 120-122 may be rapidly matched to corresponding features on another object at a later time, as described in more detail below.

Figure 2A:
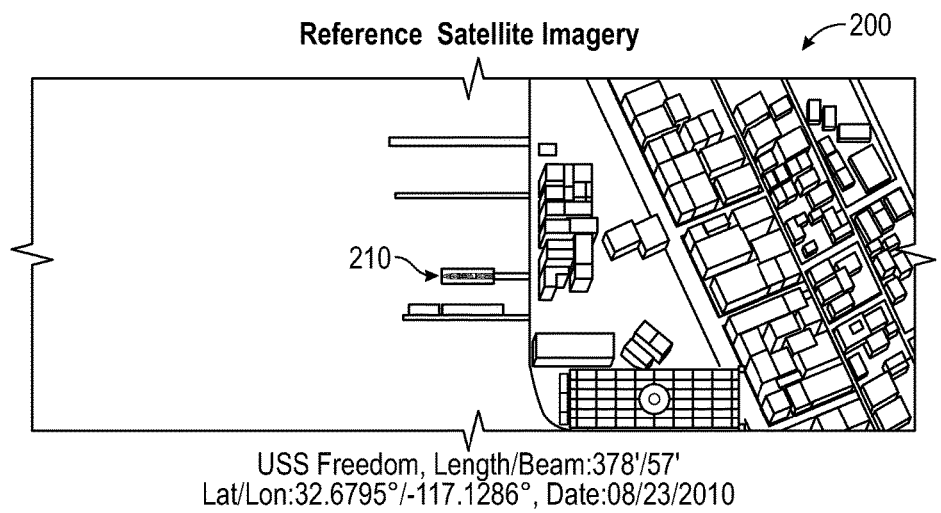
FIG. 2A illustrates a second image captured from the first viewpoint.
Figure 2B:
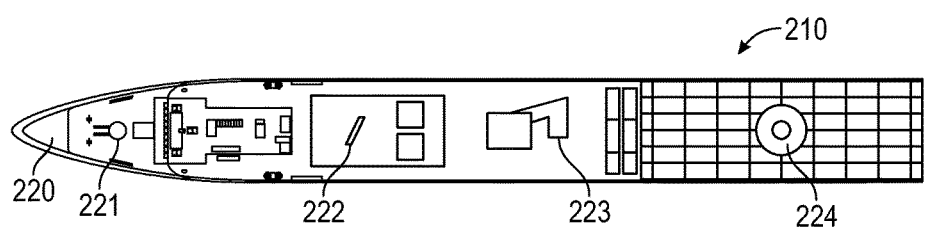
FIG. 2B illustrates an enlarged view of an object (e.g., a second ship) in the second image.

FIG. 2A illustrates a second image 200 captured from the first viewpoint, and FIG. 2B illustrates an enlarged view of an object 210 in the second image 200. The second image 200 may also be captured by the first source (e.g., the satellite), and the object 210 in the second image 210 may be another ship. The identity of the object 210 may be known at the time the second image 200 is captured. For example, using data contained in the second image 200 and/or its metadata, it may be determined that the object 210 is the U.S. ship "Freedom." In another embodiment, the identity of the object 210 may be determined using data unrelated to the second image 200.

The second image 200 may be transmitted to the object verification module 600 (see FIG. 6), which may analyze the second image 200 and/or its metadata to determine the geographic location of the object 210 (e.g., 32.6795° latitude/−117.1286° longitude) and the size of the object 210 (e.g., length: 378'; beam: 57'). The second image 200 may also be analyzed to identify and enhance one or more distinctive visual features 220-224 that may be used to identify the object 210. For example, as shown in FIG. 2B, the object 210 may include five visual features 220-224.

Figure 3A:
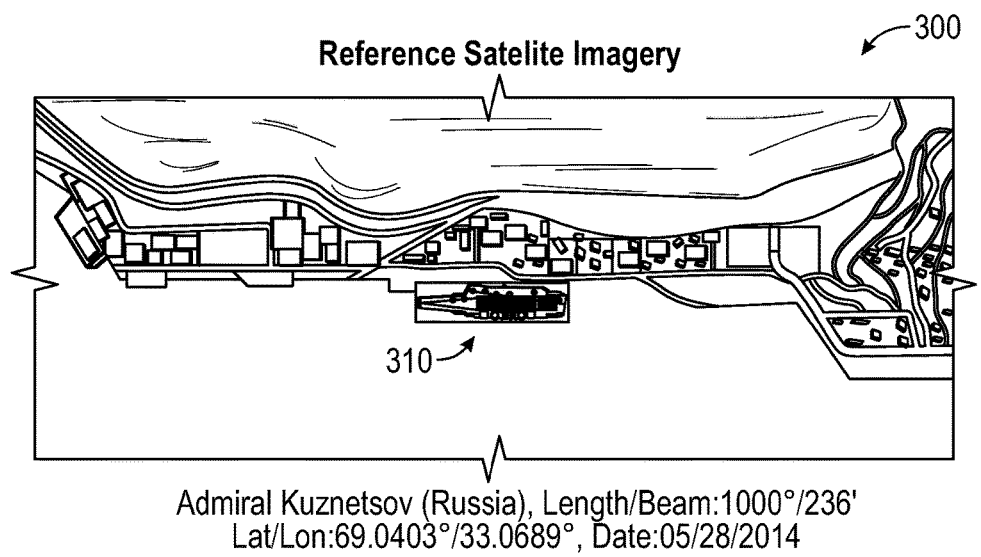
FIG. 3A illustrates a third image captured from the first viewpoint.
Figure 3B:
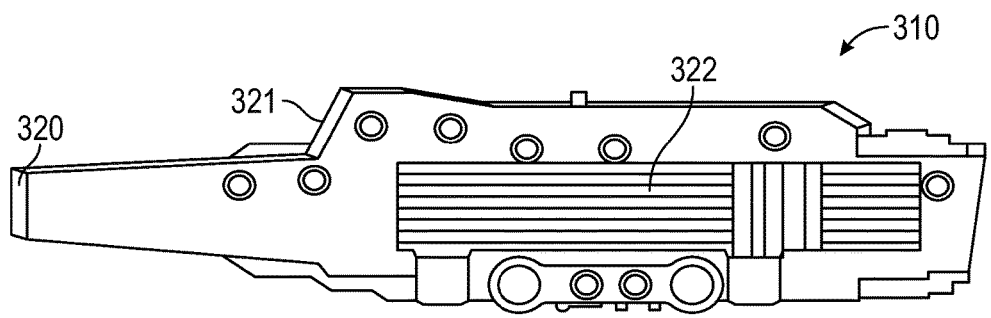
FIG. 3B illustrates an enlarged view of an object (e.g., a third ship) in the third image.

FIG. 3A illustrates a third image 300 obtained from the first viewpoint, and FIG. 3B illustrates an enlarged view of an object 310 in the third image 300. The third image 300 may also be captured by the first source (e.g., the satellite), and the object 310 in the third image 300 may be yet another ship. The identity of the object 310 may be known at the time the third image 300 is captured. For example, using data contained in or associated with the third image 300, it may be determined that the object 310 is the Russian ship "Admiral Kuznetsov." In another embodiment, the identity of the object 310 may be determined using data unrelated to the third image 300.

The third image 300 may be transmitted to the object verification module 600 (see FIG. 6), which may analyze the image 300 and/or its metadata to determine the geographic location of the object 310 (e.g., 69.0403° latitude/33.0689° longitude) and the size of the object 310 (e.g., length: 1000'; beam: 236'). The third image 300 may also be analyzed to identify and enhance one or more distinctive visual features 320-322 that may be used to identify the object 310. For example, as shown in FIG. 3B, the object 310 may include three visual features 320-322.

One or more of the objects 110, 210, 310 may be determined to be BOLO objects when their locations and activities are of particular interest, for example to a government entity (e.g., the U.S. Navy), to a competitor (e.g., a container shipping corporation), or the like. For example, when a particular ship is identified as a BOLO ship, the image of the ship and corresponding data associated with the ship may be loaded into a BOLO database. The data may include the geographic location of the ship (e.g., at the time the image was taken or at a more recent date), the size of the ship, the geometric shape of the ship, and the distinctive visual features of the ship.

Figure 4:
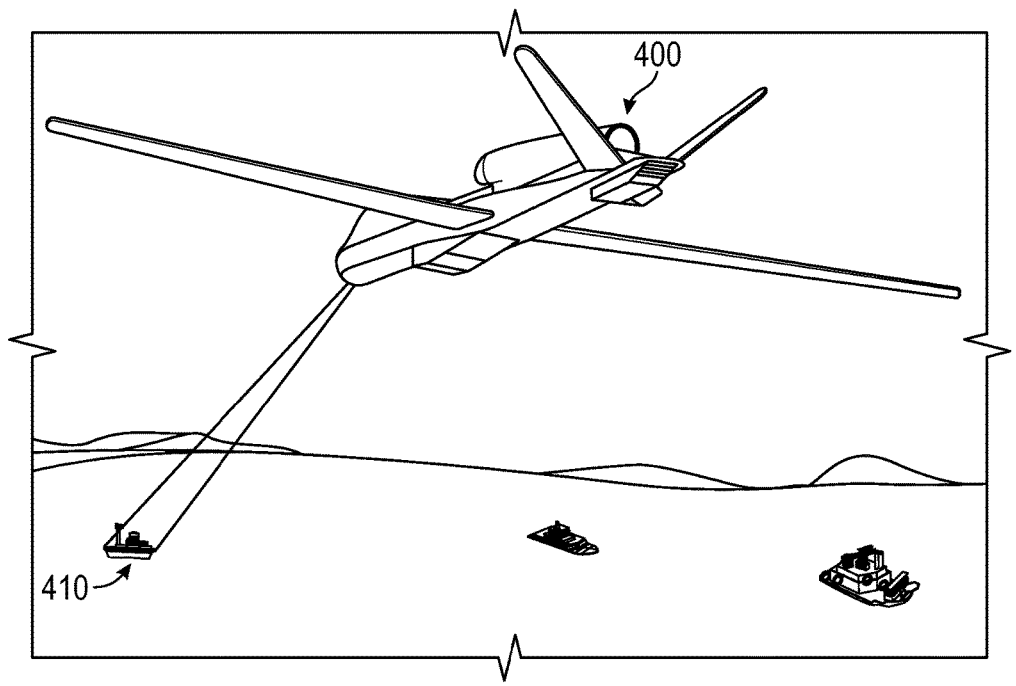
FIG. 4 illustrates a view of a second source (e.g., a UAS) capturing one or more images of an object (e.g., a ship)

FIG. 4 illustrates a view of a second source 400 capturing one or more images of an object 410. The second source 400 may be any source configured to capture an image (i.e., take a picture). The second source 400 may be the same as the first source, or, as shown here, the second source 400 may be different. For example, as shown, the second source 400 is a UAS. The image(s) obtained by the second source 400 may be a top view, a bottom view, a side view, an oblique view, a front view, a back view, or a combination thereof at any angle.

The second source 400 may include a center-surround detector for watercraft detection and an adaptive mean-shift tracker capable of online selection of distinctive features for persistent maritime target tracking, as are known in the art. The second source 400 may also include software configured to remove at least a portion of the wakes and surf from the images that it captures. This may improve analysis of the object 410 in the images. Furthermore, the geographic location (e.g., latitude and longitude) of the object 410 may be determined by tracking pixel locations in the image or by using a global positioning system ("GPS") in the second source 400, and the information representing the geographic location may be associated with the image as metadata.

Figure 5A:
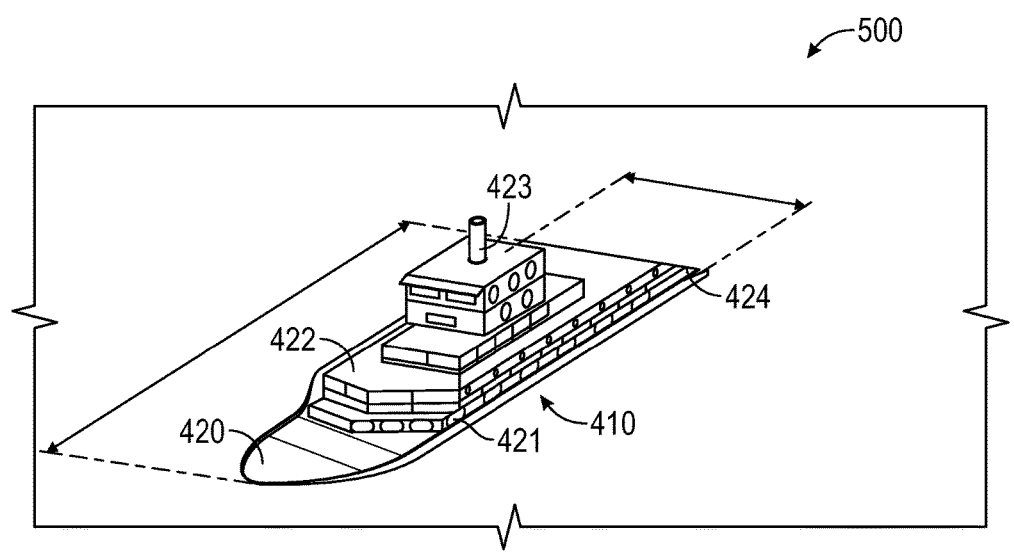
FIG. 5A illustrates a first image of the object captured by the second source.
Figure 5B:
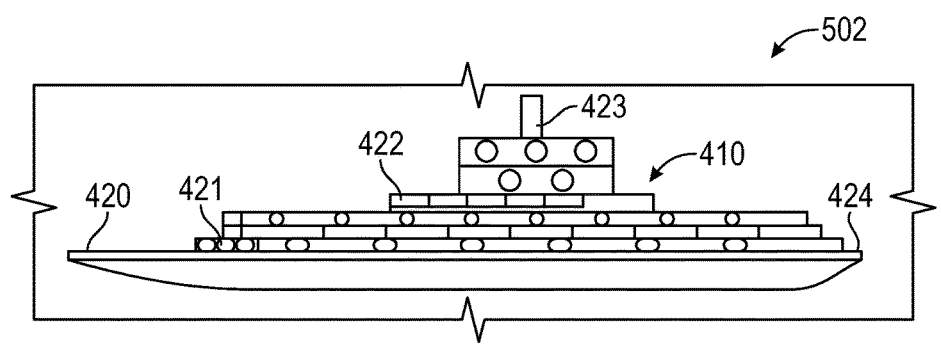
FIG. 5B illustrates a second image of the object captured by the second source.

FIG. 5A illustrates a first image 500 of the object 410 captured by the second source 400, and FIG. 5B illustrates a second image 502 of the object 410 captured by the second source 400 from a different viewpoint. The second source 400 may be maneuvered around by a user or by computer programming, and as such, the second source 400 may be configured to capture the images 500, 502 from a variety of viewpoints. As shown, the first image 500 may be a combination of a top view, a front view, and a port side view, and the second image 502 may be a starboard side view.

The view of the objects 110, 210, 310 in the images 100, 200, 300 captured by the first source may be different than the views of the object 410 in the images 500, 502 captured by the second source 400. As such the size of the object 110, 210, 310, the geometric shape of the object 110, 210, 310, and the distinctive visual features 120-122, 220-224, 320-322 of the object 110, 210, 310 in the images 100, 200, 300 captured by the first source may appear to be different than the corresponding elements or data in the images 500, 502 captured by the second source 400, even in situations where the object (e.g., 110, 410) is the same in both sets of images (e.g., 100, 500, 502). In various embodiments, the images 100, 200, 300 captured by the first source and the images 500, 502 captured by the second source 400 may be transmitted to an object verification system (see FIG. 6), which may analyze the images 100, 200, 300, 500, 502, to account for or reconcile the viewpoint differences, etc. and identify the set of images that depict the same object (e.g., 100, 500, 502), as described in more detail below.

Figures 6, 7:
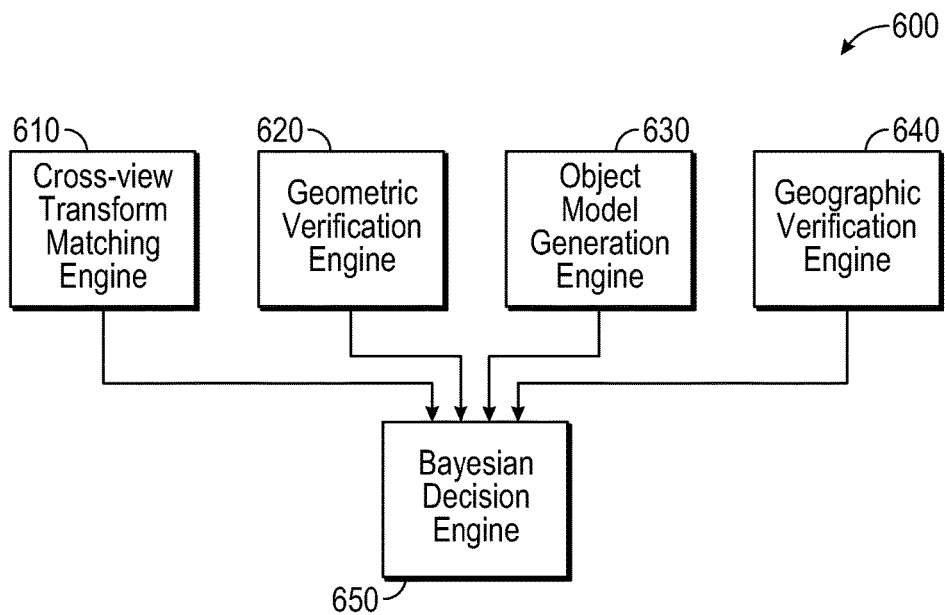
FIG. 6 illustrates a schematic view of an example of an object verification module for determining the likelihood that an object shown in an image taken from a first viewpoint is the same object shown in another image taken from second, different viewpoint.
FIG. 7 illustrates an example of a chart showing the probabilities that an object shown in an image taken from a first viewpoint is the same object shown in another image taken from second, different viewpoint.

FIG. 6 illustrates a schematic view of an example of an object verification module 600 for determining the likelihood that an object shown in an image taken from a first viewpoint is the same object shown in another image taken from second, different viewpoint. Following the example from the previous figures, the object verification module 600 may determine the likelihood that one of the objects 110, 210, 320 in FIGS. 1B, 2B, and 3B is the same object 410 that is shown in FIGS. 5A and 5B.

The object verification module 600 may include a cross-view transform and matching engine 610 that is configured to generate a matching score (e.g., a percentage) corresponding to the likelihood that visual features (e.g., 120, 420) in disparate views are in fact the same feature. The data inputs to the cross-view transform and matching engine 610 may be visual features (e.g., SIFT, SURF) extracted from the first image 500 and the pre-computed visual features of all the candidate ships (e.g., ships 110, 210, 310, etc.) that are stored in a database (e.g., the BOLO database). The cross-view transform and matching engine 610 may be trained using many sets of corresponding visual features extracted from multiple views using kernel tensor analysis and relevant vector machines. Once trained, the cross-view transform and matching engine 610 may map the visual features (e.g., features 420-424) extracted from the view of the first image 500 to the overhead view as well as other views available in the BOLO database. Then, the visual features transformed to a specific view are matched against the visual features from the corresponding view in the BOLO database. A matching score may then be computed based on the number and similarity measures (e.g., Euclidean distances of the SIFT descriptors) of the matched features between the ship 410 in the first image 500 and a candidate ship (e.g., ship 110, 210, 310) in the BOLO database.

The object verification module 600 may also include a geometric verification engine 620 that is configured to generate a matching score (e.g., a percentage) corresponding to the likelihood that the visual features (e.g., 120, 420) in disparate views are in the same location on the object 110, 510. For example, the visual feature 120 on the object 110 in FIG. 1B may be in the same location as the visual feature 420 on the object 410 in FIG. 5A. For each object (e.g., ship 110, 210, 310) in the BOLO database, the matching score may be computed based upon the number, and residual errors, of the inlier matches that obey the recovered mapping. The inputs to the geometric verification engine 620 may include the 2D image locations of the matched features from the cross-view transform and matching engine 610.

If the object (e.g., ship 410) in the image 500 captured by the second source 400 matches the candidate ship (e.g., ship 110), the 2D image locations of their visual feature correspondences may obey certain constraints in multiple view geometry. One example is the epipolar constraint. Feature matches from the same object may produce a small residual model fitting error when the underlying fundamental matrix is computed. The geometric verification engine 620 may compute the fundamental matrix from the matched features as well as a matching score according to the model fitting residual error. The matching score from the geometric verification engine 620 may be computed based on fitting the matched features to a geometric model, while the matching score from the cross-view transform and matching engine 610 may be based on the appearance similarity of the matched features.

In some embodiments, the geometric verification engine 620 may use random sample consensus to reject false matches and recover location mapping from noisy matches. A "false match" refers to a situation where the likelihood that the features (e.g., 120, 420) in disparate views are the same feature is determined to high when, in fact, the objects 110, 410 are not the same. "Noisy matches" refer to a set of matches containing both true and false matches.

The geometric verification engine 620 may analyze both 2D pixel locations of the visual features (e.g., 120, 420) as well as their 3D locations when a 3D model is available from the object model generation engine 630. In 2D geometric verification, a fundamental matrix that encodes the 2D pixel location mapping (i.e., the epipolar constraint) is recovered. In this case, only the image pixel locations of the features are available for the feature matches. In 3D geometric verification, a Euclidian transformation may be found instead. In this case, the 3D locations of the visual features may be available. The geometric verification engine 620 may then recover a Euclidean transformation between 3D locations of the matched features.

The object verification module 600 may also include an object model generation engine 630 that is configured to generate a model of the object 410. The second source (e.g., the UAS) 400 may capture images 500, 502 of the object 410 from multiple viewpoints. The object model generation engine 630 may combine the data from these multiple viewpoints and generate a 2D or 3D model of the object 410. The object model generation engine 630 may generate the model using sparse bundle adjustment and multi-view stereo techniques to fuse position metadata into a modelling pipeline to recover the scale of the model to obtain mensuration of the dimensions of the object 410.

In one embodiment, the inputs to the object model generation engine 630 may include a video or a set of images of the object 410 captured by the second source 400 as well as additional metadata of the second source 400 such as its geolocation, speed, attitude, and camera intrinsic parameters. To generate the 3D model of the object 410, a set of features may be first tracked from the video or matched across the images of the object 410. Then, the 3D model of the object 410 may be computed using bundle adjustment based on the feature trajectories and the metadata of the second source 400. Once the 3D model of the object 410 is acquired, a mensuration feature vector describing the dimensions of the object 410 such as length and beam may be formed using measures from the recovered 3D model. For each candidate ship (e.g., ship 110, 210, 310) in the BOLO database, a matching score (e.g., a percentage) may be computed based on the Euclidean distance between the mensuration features of the object 410 and the candidate ship. The dimension matching score may correspond to the likelihood that dimensions of the object 110, 210, 310 in the image 100, 200, 300 captured by the first source are the same as the dimensions of the object 410 in the images 500, 502 captured by the second source 400.

The object verification module 600 may also include a geographic verification engine 640 that is configured to generate a matching score (e.g., a percentage) corresponding to the likelihood that the object 110, 210, 310 in the image 100, 200, 300 captured by the first source could be in the same geographic location as the object 410 in the images 500, 502 captured by the second source 400. The geographic location of the object 110, 210, 310 in the image 100, 200, 300 captured by the first source may be known at the time that the image 100, 200, 300 was taken. Additional information related to the geographic location of the object 110, 210, 310 may also be known subsequent to the time that the image 100, 200, 300 was taken. The geographic location of the object 410 in the images 500, 502 captured by the second source 400 may also be known at the time that the images 500, 502 are taken. By analyzing the trajectory, distance, and/or time between the last known geographic location of the object 110, 210, 310 and the current geographic location of the object 410, the geographic verification engine 640 may determine the likelihood that the object 110, 210, 310 in the image 100, 200, 300 captured by the first source could be in the same geographic location as the object 410 in the images 500, 502 captured by the second source 400. For example, it may be possible for a ship to travel 100 miles in 12 hours, but it is not be possible for a ship to travel 1000 miles in 12 hours.

The object verification module 600 may also include a Bayesian decision engine 650 that is configured to combine the matching scores from the various engines 610, 620, 630, 640 and to determine a final verification probability for each object 110, 210, 310 in the BOLO database. The matching scores from each first matching engine are converted to matching probabilities between the object 410 and the candidate ships (e.g., ships 110, 210, 310). This may be done using the softmax function. The matching probabilities from all the engines 610, 620, 630, 640 may then be combined using the sum rule. The combined matching probabilities may then be multiplied by the geographic verification likelihood to get the final verification probabilities.

FIG. 7 illustrates an example of a chart showing the probabilities that an object shown in an image taken from a first viewpoint is the same object shown in another image taken from second, different viewpoint. Thus, using the example from the previous FIGs., FIG. 7 shows the probabilities that the objects 110, 210 in FIGS. 1B and 2B are the same object 410 that shown in FIGS. 5A and 5B. The Bayesian decision engine 650 may generate a list of top candidates in the BOLO database ranked according to their final verification probabilities, for example, as shown in FIG. 7. An object in the BOLO database may be determined to be a successful match with an object in the images 500, 502 captured by the second source 400 when the final verification probability calculated by the Bayesian decision engine 650 is greater than or equal to a predetermined amount (e.g., 90%). For example, the object 110 from FIG. 1B may be determined to be a match to the object 410 in FIGS. 5A and 5B (i.e., they are the same ship) because the final verification probability is 93%. Once the object 110 in the BOLO database is successfully verified, the geographic location of the object 110, 410 (e.g., at the time the image was taken or at a more recent date), the size of the object 110, 410, and the distinctive visual features 420-424 of the object 410 from the images 500, 502 captured by the second source 400 may be used to augment the data in the object verification module 600 to facilitate future verification of the same object 410.

Figure 8:
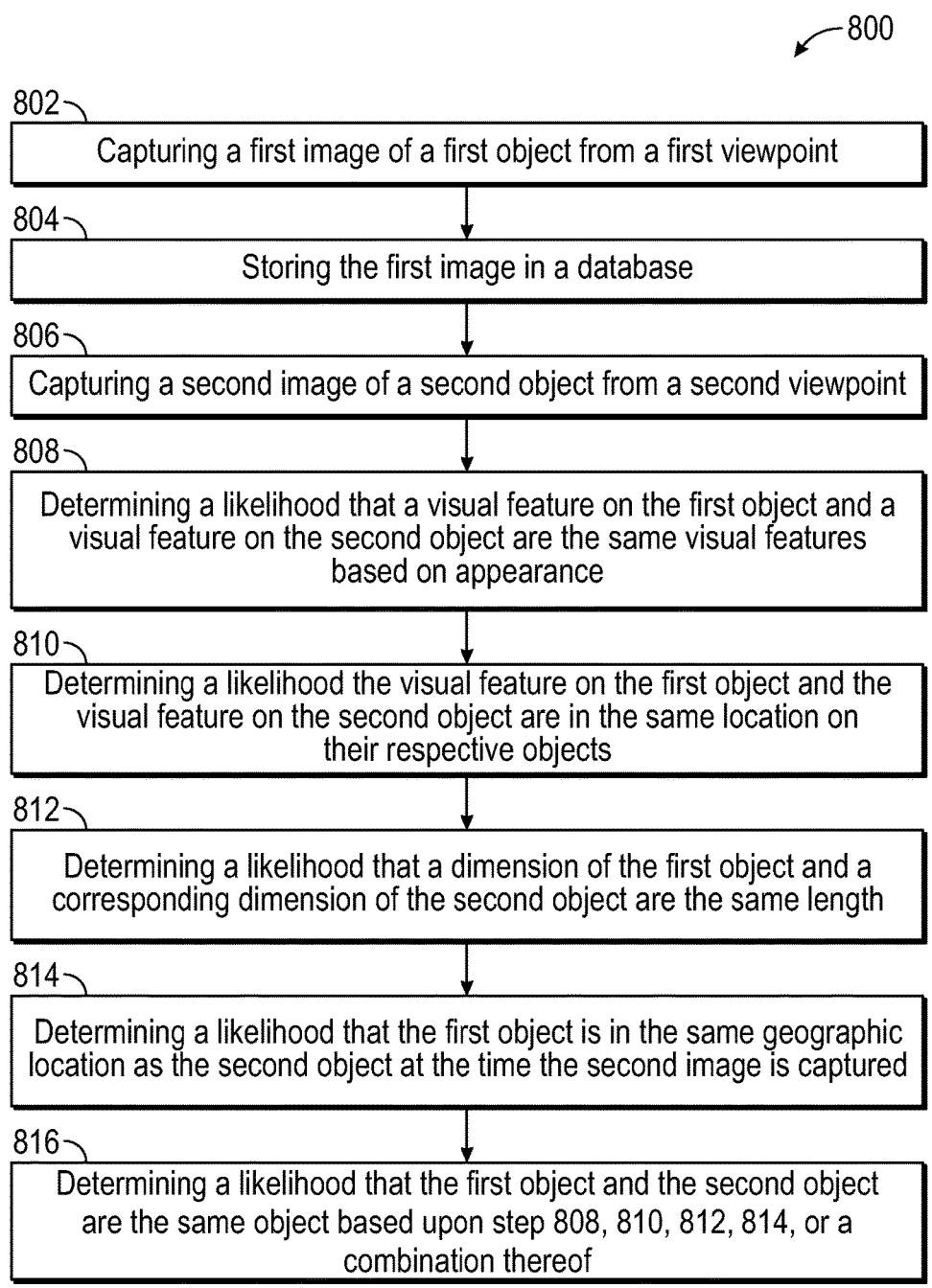
FIG. 8 illustrates a flowchart of an example of a method for determining the likelihood that an object captured in one or more images from a first viewpoint is the same object that is captured in one or more images from a second viewpoint.

FIG. 8 illustrates a flowchart of an example of a method 800 for determining the likelihood that an object captured in one or more images from a first viewpoint is the same object that is captured in one or more images from a second viewpoint. The method 800 may begin by capturing a first image (e.g., image 100) of a first object 110 from a first viewpoint, as at 802. The first image 100 may be captured by a first source. The first object 110 may include one or more distinctive visual features 120-122. If the object 110 in the first image 100 is determined to be of particular interest, a user may cause the first image 100 to be stored in a BOLO database, as at 804.

A second image (e.g., image 500) of a second object 410 may then be captured from a second viewpoint that is different than the first viewpoint, as at 806. The second image 500 of the second object 410 may be captured by the first source or by a second source 400. The second object 410 may include one or more distinctive visual features 420-424. The second image 500 may also be stored in the BOLO database.

A likelihood that a visual feature 120 on the first object 110 and a visual feature 420 on the second object 410 are the same visual feature may be determined, as at 808. This determination may include the appearance of the visual features 120, 420. In some implementations, this operation may be performed by the cross-view transform matching engine 610.

A likelihood that the visual feature 120 on the first object 110 and the visual feature 420 on the second object 410 are in the same location on their respective objects 110, 410 may also be determined, as at 810. In some implementations, this operation may be performed by the geometric verification engine 620.

A likelihood that a dimension (e.g., beam) of the first object 110 and a corresponding dimension (e.g., beam) of the second object 410 are the same may be determined, as at 812. In some implementations, this operation may be performed by the object model generation engine 630.

A likelihood that the first object 110 is in the same geographic location as the second object 410 at the time that the second image 500 was taken may be determined, as at 814. In some implementations, this operation may be performed by the geographic verification engine 640.

The likelihoods may then be weighted and aggregated to determine a likelihood (e.g., a final verification probability) that the first object 110 and the second object 410 are the same object, as at 816. In some implementations, this operation may be performed by the Bayesian decision engine 640.

In response the result determined in step 816, an alert may be transmitted to a user that informs the user whether the first object 110 and the second object 410 are, in fact, the same object, as at 818. In some embodiments, the alert may only be sent when the first object 110 and the second object 410 are the same object. In other embodiments, the alert may only be sent when the first object 110 and the second object 410 are not the same object. The alert may be in the form of a pop-up box on a display of a device such as a smart phone, a tablet, a laptop, a desktop computer, or the like. In another embodiment, the alert may be in the form of a text message or an email.

In one embodiment, the alert may be transmitted to the user's computer system; however, the computer system may be offline (e.g., not connected to the Internet). Thus, the computer system may not receive the alert. When this occurs, the alert may be transmitted over a wireless communication channel to a wireless device (e.g., a smart phone). The alert may display on the wireless device. The alert may include a uniform resource locator ("URL") that specifies the location of the data source (e.g., the BOLO database or other server) where the images 100, 200, 300, 500, 502 are stored and/or where the results of the object verification module 600 are stored. The user may then connect the wireless device to the user's computer system, and the alert may cause the computer system to auto-launch (e.g., open) an application loaded on the user's computer. When the computer system is connected to the Internet, the user may then click on the URL in the alert to use the application to access the images 100, 200, 300, 500, 502 and/or the results of the object verification module 600.

Figure 9:
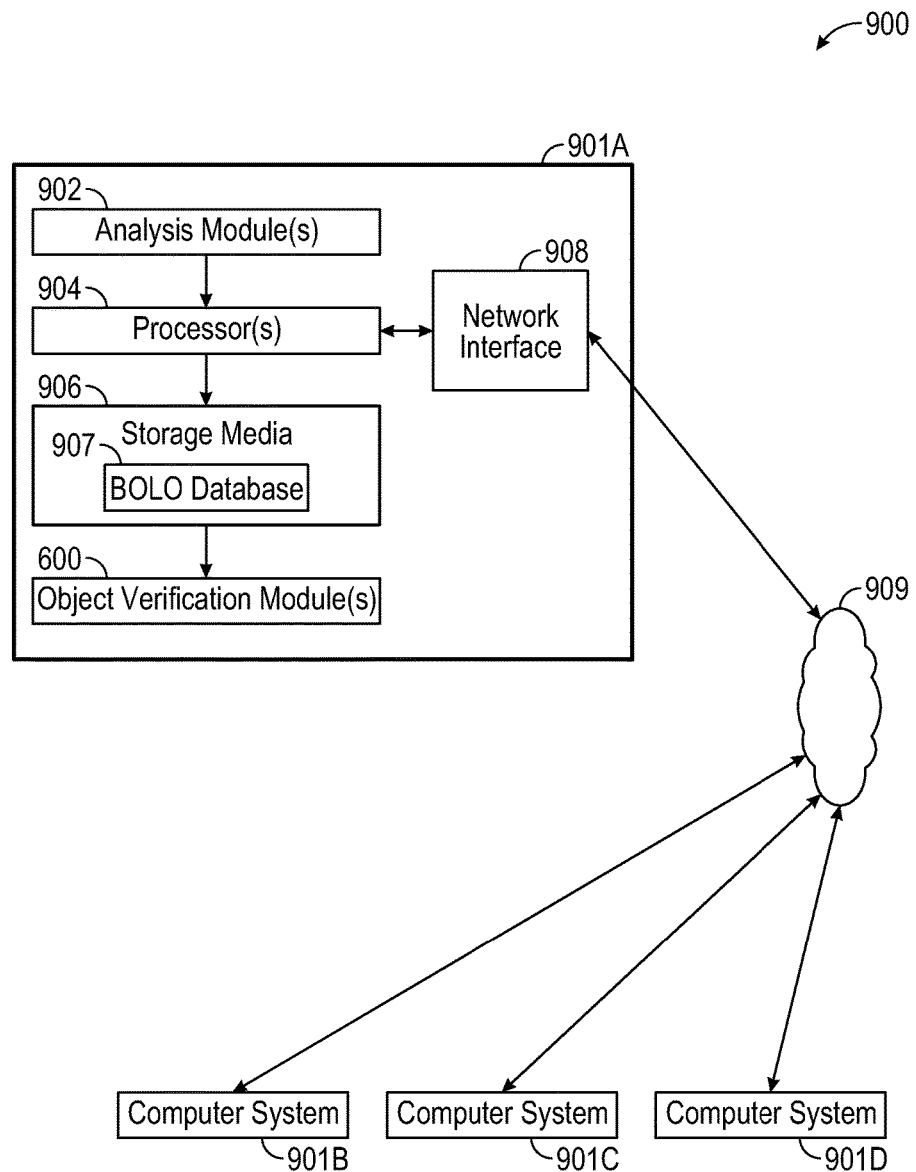
FIG. 9 illustrates an example of a computing system for performing one or more of the methods disclosed herein.

FIG. 9 illustrates an example of a computing system 900 for performing one or more of the methods, functions, or operations disclosed herein. The computing system 900 may include a computer or computer system 901A, which may be an individual computer system 901A or an arrangement of distributed computer systems. The computer system 901A includes one or more analysis modules 902 that are configured (e.g. include processor-executable instructions) to perform various tasks according to some embodiments, such as one or more methods disclosed herein. To perform these various tasks, the analysis module 902 executes independently, or in coordination with, one or more processors 904, which is (or are) connected to one or more storage media 906A. The processor(s) 904 is (or are) also connected to a network interface 908 to allow the computer system 901A to communicate over a data network 909 with one or more additional computer systems and/or computing systems, such as 901B, 901C, and/or 901D (note that computer systems 901B, 901C and/or 901D may or may not share the same architecture as computer system 901A, and may be located in different physical locations, e.g., computer systems 901A and 901B may be located in a processing facility, while in communication with one or more computer systems such as 901C and/or 901D that are located in one or more data centers, and/or located in varying countries on different continents).

The storage media 906 can be implemented as one or more computer-readable or machine-readable storage media, which may be non-transitory and which may include processor-executable instructions. Note that while in the example embodiment of FIG. 9 storage media 906 is depicted as within computer system 901A, in some embodiments, storage media 906 may be distributed within and/or across multiple internal and/or external enclosures of computing system 901 and/or additional computing systems. In one embodiment, the storage media 906 may include the BOLO database 907. The storage media 906 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed herein can be provided on one computer-readable or machine-readable storage medium, or in other embodiments, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

The computing system 900 may include the object verification module 600, which may be implemented by processor-executable instructions, and which may be in communication with the analysis module 902, the processor 904, and the storage media 906 (e.g., including the BOLO database 907). It should be appreciated that computing system 900 is one example of a computing system, and that computing system 900 may have more or fewer components than shown, may combine additional components not depicted in the example embodiment of FIG. 9, and/or computing system 900 may have a different configuration or arrangement of the components depicted in FIG. 9. The various components shown in FIG. 9 may be implemented in hardware, software, or a combination of both hardware and software, including one or more signal processing and/or application specific integrated circuits.

Further, aspects of the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

While the invention is described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method for analyzing images, the method comprising:
   capturing, using a first camera, a first image from a first viewpoint, wherein a first object at a first geographic location is in the first image;
   capturing, using a second camera, a second image from a second viewpoint, wherein a second object at a second geographic location is in the second image;
   determining, using a processor, a first percentage that a first visual feature on the first object and a second visual feature on the second object are the same visual feature;
   determining, using the processor, a second percentage that a dimension of the first object and a corresponding dimension of the second object are the same;
   determining, using the processor, a final percentage that the first object and the second object are the same object based at least partially upon the first percentage and the second percentage; and
   storing the final percentage in a memory device.

2. The method of claim 1, wherein the first percentage is based at least partially upon a similarity of an appearance of the first visual feature on the first object and an appearance of the second visual feature on the second object.

3. The method of claim 2, wherein the first percentage is also based at least partially upon a location of the first visual feature on the first object and a location of the second visual feature on the second object.

4. The method of claim 1, further comprising determining, using the processor, a third percentage that the first object is in the same geographic location as the second object at a time that the second image is captured.

5. The method of claim 1, wherein the first image is captured by the first camera on a satellite, and the second image is captured by the second camera on an unmanned aircraft system.

6. The method of claim 1, further comprising:
   generating a model of the second object based at least partially upon the second image; and
   wherein determining the second percentage comprises:
      determining the second percentage that the dimension of the first object and the corresponding dimension of the second object are the same based at least partially on the model of the second object.

7. The method of claim 1, wherein determining the final percentage comprises calculating a Bayesian probability using the first percentage and the second percentage.

8. The method of claim 7, wherein the first object and the second object are determined to be the same object when the Bayesian probability is greater than or equal to a predetermined percentage.

9. The method of claim 1, wherein the first object is a first ship, and the second object is a second ship.

10. The method of claim 1, further comprising transmitting an alert to a user indicating the final percentage.

11. The method of claim 10, further comprising providing an application to the user for installation on a computer system, wherein the alert is transmitted over a wireless communication channel to a wireless device, and wherein the alert causes the computer system to auto-launch the application when the wireless device is connected to the computer system.

12. The method of claim 11, wherein the computer system is offline when the alert is transmitted.

13. The method of claim 12, wherein the alert includes a uniform resource locator that specifies a data source where the first and second images are stored, and wherein the alert enables connection via the uniform resource locator to the data source over the Internet when the wireless device is connected to the computer system and the computer system comes online.

14. A non-transitory computer-readable medium storing instructions that, when executed by one or more processors of a computer system, cause the computer system to perform operations, the operations comprising:
   providing an application to a user for installation on a second computer system;
   capturing a first image, using a first camera, from a first viewpoint, wherein a first object at a first geographic location is in the first image;
   capturing a second image, using the first camera, from a second viewpoint, wherein a second object at a second geographic location is in the second image;
   determining, using a processor, a first percentage that a first visual feature on the first object and a second visual feature on the second object are the same visual feature;

determining, using the processor, a second percentage that a dimension of the first object and a corresponding dimension of the second object are the same;

determining, using the processor, a third percentage that the first object is in the same geographic location as the second object at a time that the second image is captured;

determining, using the processor, a final percentage that the first object and the second object are the same object based at least partially upon the first percentage, the second percentage, and the third percentage;

storing the final percentage in a memory device; and transmitting an alert, which indicates the final percentage, over a wireless communication channel to a wireless device when the second computer system is offline, wherein the alert causes the second computer system to auto-launch the application when the wireless device is connected to the second computer system.

15. A system for analyzing images, the system comprising:

a cross-view transform and matching device generating a first percentage that a first visual feature on a first object in a first image and a second visual feature on a second object in a second image are the same visual feature, wherein the first object is at a first geographic location when captured by a first camera, and the second object is at a second geographic location when captured by a second camera;

a geometric verification device generating a second percentage that a location of the first visual feature on the first object and a location of the second visual feature on the second object are the same location;

an object model generation device generating a third percentage that a length of a portion of the first object and a length of a corresponding portion of the second object are the same length;

a geographic verification device generating a fourth percentage that the first object is in the same geographic location as the second object at a time that the second image is captured; and a decision device determining a final percentage that the first and second objects are the same object based upon the first percentage from the cross-view transform and matching engine, the second percentage from the geometric verification engine, the third percentage from the object model generation unit, and the fourth percentage from the geographic verification engine.

16. The system of claim 15, wherein the cross-view transform and matching device is trained using a plurality of visual features from a plurality of images using kernel tensor analysis.

17. The system of claim 15, wherein the second percentage of the geometric verification device is computed based on fitting the first visual feature to a model of the second object.

18. The system of claim 15, wherein the object model generation device generates a three dimensional model of the second object.

19. The system of claim 18, wherein the length of the portion of the second object is recovered from the model.

20. The system of claim 15, wherein the fourth percentage of the geographic verification device is based upon a distance and time between a last known geographic location of the first object and the geographic location of the second object at the time that the second image is captured.

21. The method of claim 1, wherein the first geographic location and the second geographic location are different geographic locations.

22. The non-transitory computer-readable medium of claim 14, wherein the first geographic location and the second geographic location are different geographic locations.

23. The system of claim 15, wherein the first geographic location and the second geographic location are different geographic locations.

* * * * *